United States Patent [19]
Ito et al.

[11] Patent Number: 5,440,536
[45] Date of Patent: Aug. 8, 1995

[54] OPTICAL DISK APPARATUS FOR PRODUCING INFORMATION RECORDED ON A RECORDING TRACK

[75] Inventors: Noboru Ito, Hirakata; Shinichi Tanaka, Kyoto; Hidenori Wada, Sakai; Sadao Mizuno, Ibaraki; Hideki Hayashi, Katano, all of Japan

[73] Assignee: Matsushita Electric Industrial Co., Ltd., Osaka, Japan

[21] Appl. No.: 202,518

[22] Filed: Feb. 28, 1994

Related U.S. Application Data

[62] Division of Ser. No. 993,384, Dec. 18, 1992, Pat. No. 5,347,504.

[30] Foreign Application Priority Data

Dec. 19, 1991 [JP] Japan .................. 3-336505

[51] Int. Cl.[6] .............................. G11B 7/00
[52] U.S. Cl. ...................... 369/44.410; 369/44.42; 369/44.23
[58] Field of Search .............. 369/44.14, 44.23, 44.41, 369/44.42, 110, 13; 250/201.5

[56] References Cited

U.S. PATENT DOCUMENTS

| | | | |
|---|---|---|---|
| 4,517,666 | 5/1985 | Ando | 369/44.41 X |
| 5,200,941 | 4/1993 | Matoba et al. | 369/44.42 X |
| 5,200,942 | 4/1993 | Hosobata et al. | 369/44.41 |
| 5,253,237 | 10/1993 | Miyake et al. | 369/44.42 X |

FOREIGN PATENT DOCUMENTS

| | | | |
|---|---|---|---|
| 57-58248 | 4/1982 | Japan . | |
| 0059630 | 3/1986 | Japan | 369/44.41 |
| 61-131245 | 6/1986 | Japan . | |

*Primary Examiner*—A. Psitos
*Assistant Examiner*—Thang V. Tran
*Attorney, Agent, or Firm*—Ratner & Prestia

[57] ABSTRACT

An optical disk apparatus includes a photodetector divided into eight segments which receive the laser beam reflected from the optical disk and produce signals based on the laser beam sport thereon. In this apparatus, these eight segments are combined in several patterns for the recorded information reproduction, the tracking error detection, and the focus error detection, respectively. For the recorded information reproduction, eight segments are used as combined in three segment cells RC1, RC2, and RC3 which extend in a direction parallel to each other such that the segment cell RC1 is in center and is sandwitched by other segment cell RC2 and RC3. The segment cells RC1, RC2, and RC3 are located perpendicular to the recording track of the optical disk and produce three signals C, R, and L indicative of the laser beam intensity of the laser beam spot thereon, respectively. Thus obtained signals C is multiplied by a constant K and then added to the other signals R and L. By selecting suitable value as the constant K, the crosstalk component in the reproduced signal can be reduced.

5 Claims, 15 Drawing Sheets

OPTICAL DISK APPARATUS FOR PRODUCING INFORMATION RECORDED ON A RECORDING TRACK

This application is a continuation of application Ser. No. 07/993,384, filed Dec. 18, 1992, now U.S. Pat. No. 5,347,504.

BACKGROUND OF THE INVENTION

1. Field of the Invention

The present invention relates to an optical disk apparatus for optically recording on the optical recording medium or reproducing the recorded information therefrom and, more particularly, to an optical disk apparatus for optically recording and reproducing an information from an optical disk.

2. Description of the Prior Art

One effective means of improving the recording density of an optical disk apparatus is to reduce the track pitch. Unfortunately, cross talk of the signals reproduced from adjacent tracks to a target track increases when the track pitch is reduced. A method for solving such problem, for example, which the Japanese Laid-Open Patent Publication No. 57-58248, published Apr. 7, 1982 proposes is described with reference to FIG. 25. When a target signal SC is reproduced from a target track 2C by a laser spot 1C impinged thereon, the edge of the laser spot 1C intrudes into the range of the adjacent tracks 2L and 2R. As a result, three signals are simultaneously reproduced from three tracks 2L, 2C, and 2R laser spot 1C representing different information recorded on tracks 2L, 2C, and 2R, respectively. Thus, the target signal SC from the target track 2C is interfered by the noise signals from the adjacent tracks 2L and 2R, suffering from a cross talk caused by those signals.

To eliminate this problem, additional laser spots 1L and 1R are provided to scan the adjacent tracks 2L and 2R. The signals from the adjacent tracks 2L and 2R are therefore simultaneously played back, multiplied by a given constant, and subtracted from the intended track 2C signal to reduce crosstalk interference from the adjacent tracks 2L and 2R. The resulting signal S can be defined by the equation of $$S = SC - K \times (SL + SR)$$

where SC is the reproduced signal from track 2C output by the first laser spot 1C, SL and SR are the playback signals from tracks 2L and 2R output by laser spots 1L and 1R, respectively, and K is a constant.

However, as will be obvious, the method of the prior art as thus described requires three laser spots to simultaneously read the signals from the target track and the two tracks adjacent thereto. This results in a more complex optical system, and makes it difficult to reduce unit size and cost, and to improve reliability.

SUMMARY OF THE INVENTION

The object of the present invention is therefore to provide an imaging device which solves these problems.

The present invention has been developed with a view to substantially solving the above described disadvantages and has for its essential object to provide an improved optical disk apparatus.

In order to achieve the aforementioned objective, a optical disk apparatus for reproducing an information recorded on a recording track of an optical recording medium comprises a light source means for emitting a laser beam in a first direction; a beam splitting means located adjacent said laser source means for splitting said emitted light into first, second, and third leaser beams having diffraction orders of $+1$, 0, and $-1$, respectively; a converging means located between said optical recording medium and said beam splitting means for conversing said second laser beam on said recording track and said first and second laser beams around opposite sides of said recording track; a beam guide means located in piths of reflected laser beams from said optical recording medium in a second direction; a first photodetection means inserted in a path of said guided second laser beam reflected from said recording track passing through said converging means and said beam guide mean, said first photodetection means receiving said second laser beam for producing focus signal and producing information signals representing said information recorded on said recording track based on said received reflected second laser beam; and second photodetection means inserted in paths of said first and third laser beams reflected from portions around opposite sides of said recording track, respectively, for producing tracking signals.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
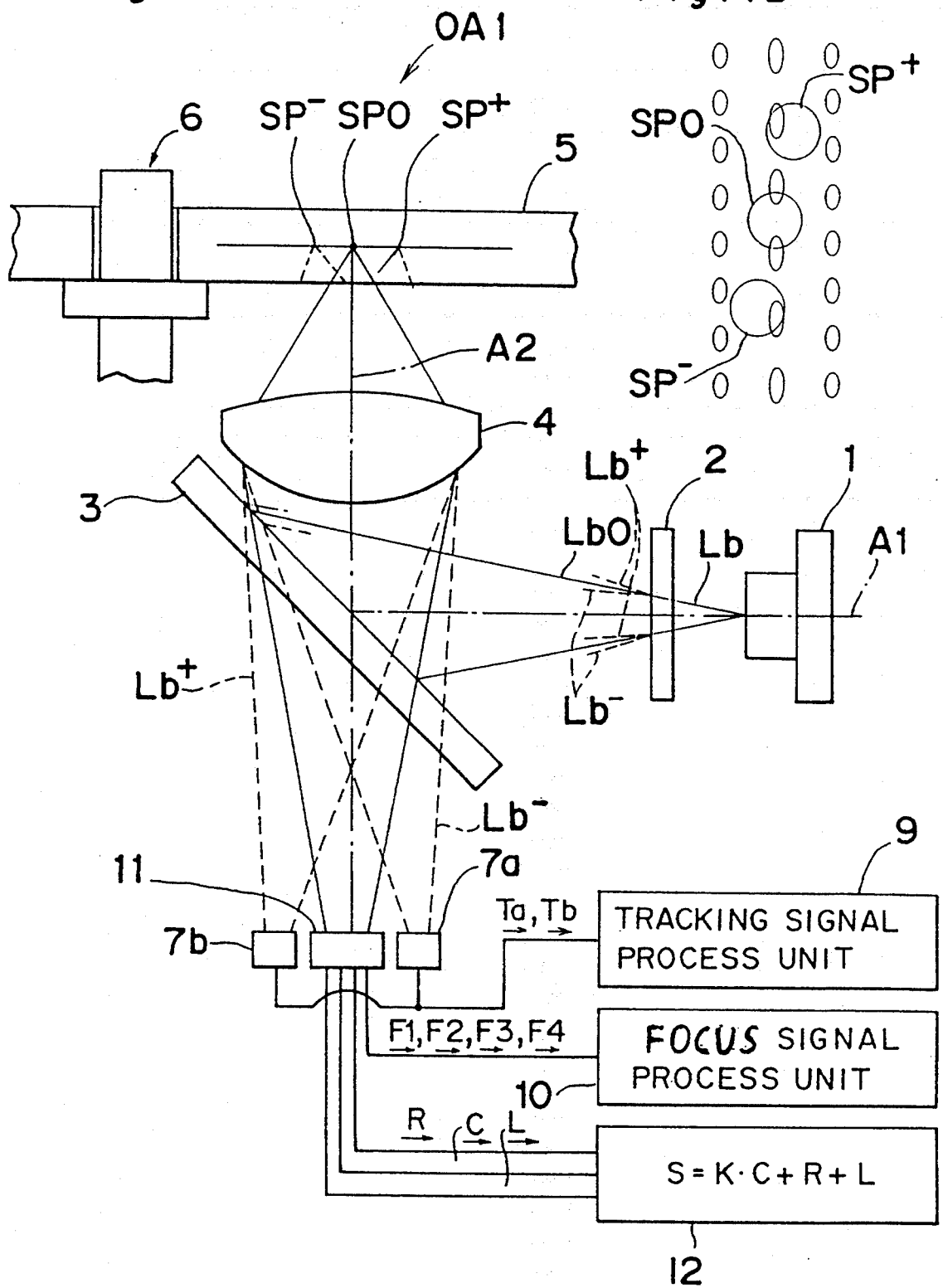
FIG. 1A is a block diagram of an optical disk apparatus according to a first preferred embodiment of the present invention.
FIG. 1B is a plan view showing three laser beam spots focused on a recording surface of the optical disk.

Referring to FIG. 1A, an optical disk apparatus according to a first embodiment of the present invention is shown. The optical disk apparatus OA1 includes a support unit 6 for rotatably supporting an optical disk 5 having a main plane formed with a track for recording the information thereon. The optical disk apparatus OA1 further includes a semi-conductor laser source 1 for emitting a laser beam L along an optical axis A1 and a deflection plate 2 for diffracting the emitted laser beam Lb to produce three laser beams Lb+, Lb0, and Lb− having diffraction orders of "+1", "0", and "−1", respectively.

A half mirror 3 is provided on one side of the deflection plate 2 away from the laser source 1 with its main plane at a predetermined angle so that the half mirror 3 reflects diffracted laser beams Lb+, Lb0, and Lb− toward the disk 5 along an optical axis A2, as shown in FIG. 1A. A condenser lens 4 is provided between the optical disk 5 and the half mirror 3 for converging the reflected laser beams Lb+, Lb0, and Lb− to make spots SP+, SP0, and SP− respectively, focused on a recording plane of the optical disk 5, as shown in FIG. 1B. The spots SP+, SP0, and SP− located on positions of the target track in a pattern according to the conventional three beam detection method is shown.

A first photodetector 11 made by a photoelectric element is provided on the optical axis A2 for receiving the laser beams Lb0 reflected from the optical disk 5 through the condenser lens 4 and the half mirror 3. The first photodetector 11 produces electric signals representing the information recorded in the target track based on the received laser beam Lb0. Second and third photodetectors 7a and 7b made by a photoelectric element are also provided on the opposite sides of the first photodetector 11 for receiving the laser beams Lb+ and Lb− and producing signals, respectively.

A tracking signal processing unit 9 is electrically connected with second and third photodetectors 7a and 7b for detecting the tracking error based on signals from the photodetectors 7a and 7b. A focus signal processing unit 10 is provided in an electrical connection with the first photodetector 11 for detecting the focus error based on signals from the first photodetector 11. The optical disk apparatus OA1 further includes a reproduced signal processing unit 12 connected with the first photodetector 11. The reproduced signal processing unit 12 reproduces the information signal based on the signals from the first photo detector 11.

In operation, the semiconductor laser source 1 emits the laser beam Lb toward the half mirror 3 through the deflection plate 2 by which the emitted light Lb is split into three beams Lb+, Lb0, and Lb−. The half mirror 3 reflects the diffracted laser beams Lb+, Lb0, and Lb− toward the condenser lens 4. The condenser lens 4 converges the three beams Lb+, Lb0, and Lb− to make spots SP+, SP0, and SP− on and around the recording track. The spot SP0 is focused on the target track, and spots SP+ and SP− are focused on opposite sides of the target track, respectively, according to the three beam detection method.

The beams Lb+, Lb0, and Lb− are reflected by the optical disk surface 5 toward the condenser lens 5 and half mirror 3. Portions of the reflected beams Lb+, Lb0, and Lb− pass through the half mirror 3 and reach the photodetectors 7b, 11, and 7a, respectively. It is to be noted that the laser beams Lb+, Lb0, and Lb− are applied with an astigmatism when passing through the half mirror 3 which is inclined with respect to the optical axis A2 at a predetermined angle.

The second and third photodetectors 7a and 7b receive the laser beams Lb+ and Lb− and produce tracking error signals Ta and Tb based on the received laser beams Lb+ and Lb−, respectively. The tracking signal processing unit 9 processes the tracking signals Ta and Tb to obtain a tracking error signal TS by the three beam method. Since the three beam method is well known to the personell skilled in the field of optical recording technology, the further explanation is omitted for the sake of brevity.

Figure 2:
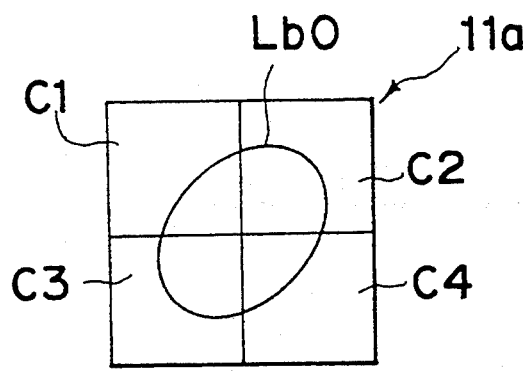
FIG. 2 is a plan view showing an example of photodetector used for the detection of focus error.

Referring to FIG. 2, an example of the first photodetector 11 used to receive the laser beam Lb0 for the detection of focus error is shown. The first photodetector 11a has four square cells C1, C2, C3, and C4, each cell is close to two other cells by two neighboring side edges, as shown in FIG. 2. When the spot SP0 is out of focus on the optical disk 5, the laser beam Lb0 makes an oval shape spot on the photodetective surface of the first photodetector 11a, varying the spot area on each cell. Then, square cells C1, C2, C3, and C4 produce focus signals F1, F2, F3, and F4 (FIG. 1A) having different strength. The focus signal processing unit 10 processes the focus signals F1, F2, F3, and F4 to obtain a focus error signal FS, as expressed by the following equation, $$FS = F1 + F4 - F2 - F3 \qquad (1).$$

Figure 3:
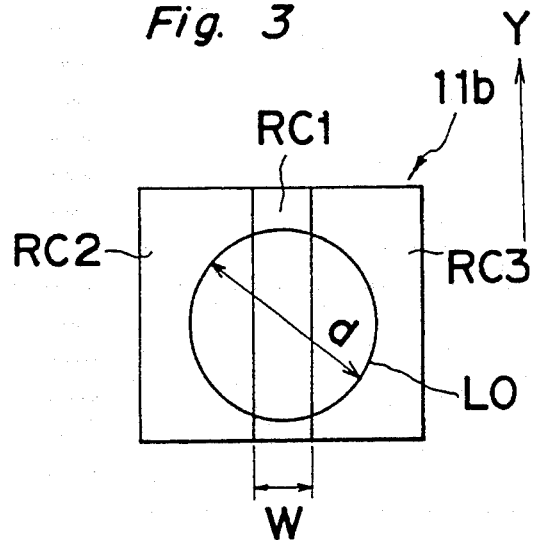
FIG. 3 is a plan view showing an example of photodetector used for reproduction of the information recorded on the tracking of the optical disk.

Referring to FIG. 3, another example of the first photodetector 11 used for receiving the laser beam Lb0 to produce an information signal S representing information recorded on the track 5 is shown. The first photodetector 11b has center, right side, and left side photodetective cells RC1, RC2, and RC3, extending in a direction parallel to each other. The center photodetective cell RC1 has a predetermined width W and is sandwiched by right and left side photodetective cells RC2 and RC3. The first photodetector 11b is aligned in a direction perpendicular to the tangent of recording track examined by the spot SP0. Then, the laser beam Lb0 makes a spot on the first photodetector 11b so that its portion corresponding to the target track is parallel to the longitudinal direction (arrow Y) of the photodetective cells RC1, RC2, and RC3, as shown in FIG. 3. The photodetective cells RC1, RC2, and RC3 produce signals C, L, and R corresponding to the spot area formed thereon, respectively. The reproduction signal processing unit 12 functions to multiply signal C by a constant K, and then add the resulting product to signals R and L and obtains the reproduced signal S representing the information recorded on the track examined by the laser spot SP0. This function is defined by the following equation, $$S = K \times C + R + L \qquad (2).$$

It is to be noted that the crosstalk component contained in the reproduced signal S can be reduced by setting the constant K at a suitable value, as will be described later.

Figure 4:
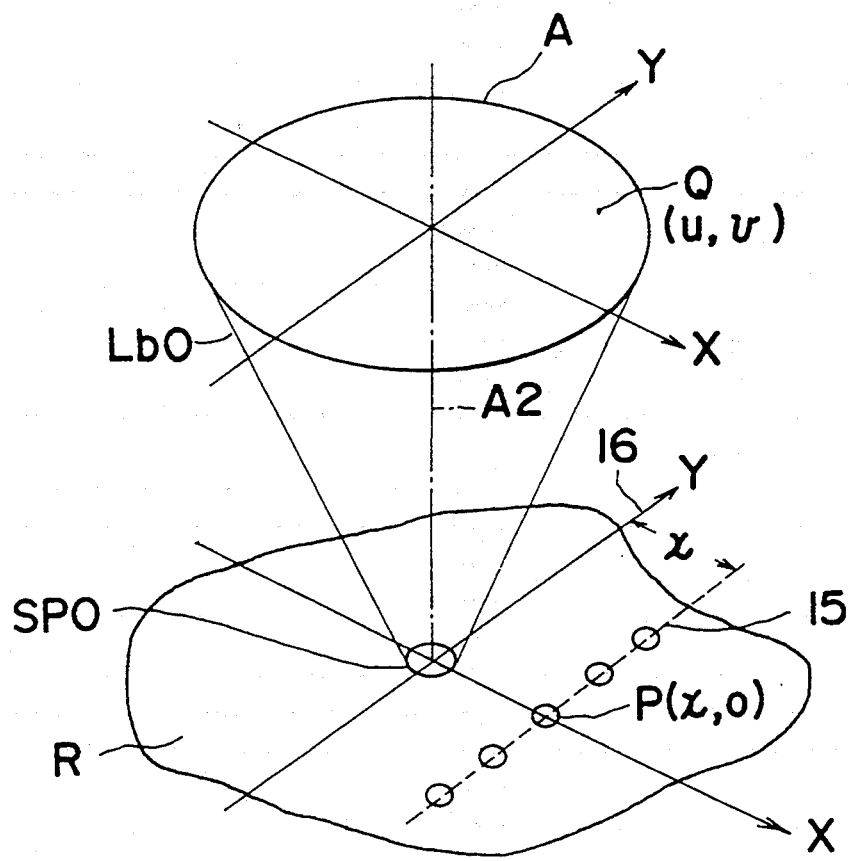
FIG. 4 is an illustration of assistance in explaining the light intensity pattern of reflected light from the optical disk when there is a pit in the adjacent track.

Referring to FIG. 4, the spot SP0 of the laser beam Lb0 focused on the target track 16 of the optical disk 5 is shown. When is viewed micrographically, the recording track 16 extends in the direction Y with a plurality of pits formed thereon. An adjacent track 15 is also formed in the optical disk 5, extending parallel to the recording track 16 apart therefrom by a predetermined distance x, and is formed with a plurality of pits thereon. When the center of the spot SP0 is the zero point of the orthogonal coordinate system with X and Y axes, the position of a pit P formed on the adjacent track 15 is expressed as P(x,0). Regarding the reduction in the crosstalk component, now the light intensity distribution on the diffraction light reflected by the single pit P on the spherical aperture plane A of the condenser lens 4 is considered.

The phase $\phi$ of the diffracted laser beam Lb0 at a point Q on the spherical aperture plane A is obtained as described below. The position of the point Q is expressed as Q (U,V) and is away from the zero point by distances U and V with respect to the axes X and Y, respectively. The phase $\phi$ is defined by the following equation.

$$\phi = 2\pi XU/F\lambda \qquad (3).$$

F is the focal length of the condenser lens 4 and $\lambda$ is the wavelength of the laser beam Lb.

From the equation (3), Ur which is the value of U when the value of $\phi$ is $\rho$ is obtained by the following equations.

$$\pi = 2\pi XUr/F\lambda \qquad (3')$$

$$Ur = \pi F\lambda/2\pi X = F\lambda/2X \qquad (4)$$

For example, when the pit P is located in the position at X=1.6 μm and Y=0 μm, the Ur is computed by the equation (4) using the values F=4 mm and λ=0.8 μm, then $$\begin{aligned} Ur &= 4 \times 0.8 \times 10^{-3} + (2 \times 1.6 \times 10^{-3}) \\ &= 1. \end{aligned} \qquad (5)$$

Thus, the phase $\phi$ inverts at U=±1 mm in this example.

Figure 5:
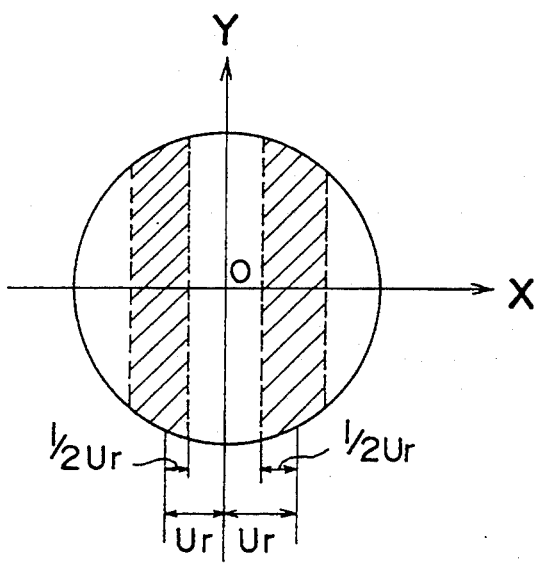
FIG. 5 is an illustration of assistance in explaining the light intensity distribution on the spherical aperture plane when there is a pit string on the adjacent track.

Referring to FIG. 5, the light intensity distribution resulted from the above equations is shown. The shaded areas extending vertically on both sides of the axis Y show the darker area compared with another area. This is because that light phase $\phi$ changes from zero to $\pi$ as moving away from the zero point (0,0) by distance ±Ur with respect to X axis. The light intensity is maximum around the Y axis, decreases gradually, and is minimum around the line where X=±Ur. Therefore, the light intensity changes from the brighter to the darker area around the position where X=±Ur/2. When it is darker around the Y axis, the light intensity changes from the darker to brighter. Thus, when the pits are shifted in direction X from the optical axis A1 (0,0), an interference pattern of light and dark bands is formed on the spherical aperture surface A in direction X, as shown in FIG. 5.

Figure 6:
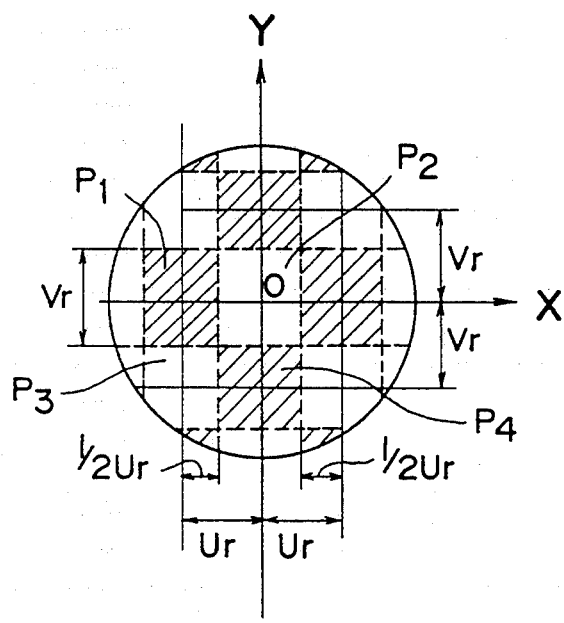
FIG. 6 is an illustration of assistance in explaining the light intensity distribution of the reflected light from the optical disk when there is a plurality of pits formed on the adjacent track.

Referring to FIG. 6, the light intensity distribution when plural pits are formed on the track 16 is shown schematically. When there are plural pits on the track 16 in the middle band (where X=0), a light-dark pattern, which will be variously determined by the pitch of the pit string, the pit width, pit length, and other conditions, will appear in this direction Y. Since the crosstalk is caused by plural pits on the adjacent tracks, it can be considered that the crosstalk is made by combining the above two states, specifically when there is one pit on the adjacent track 15 where X is not at 0 (shown in FIG. 5), and when there are plural pits in direction Y on the center track 16 where X=0. The light phase $\phi$ changes from zero pint (0,0) by distance±Vr with respect to Y axis. The darker area indicated by the shading and brighter area are arranged in a checkered pattern, as shown in FIG. 6. Thus, brighter portions P$_2$ and P$_3$ appear around the positions (0,0) and (−Ur, −Vr), and darker portions P$_1$ and P$_4$ appear around the positions (−Ur,0) and (0,−Vr), as typically shown in FIG. 6.

Figure 7:
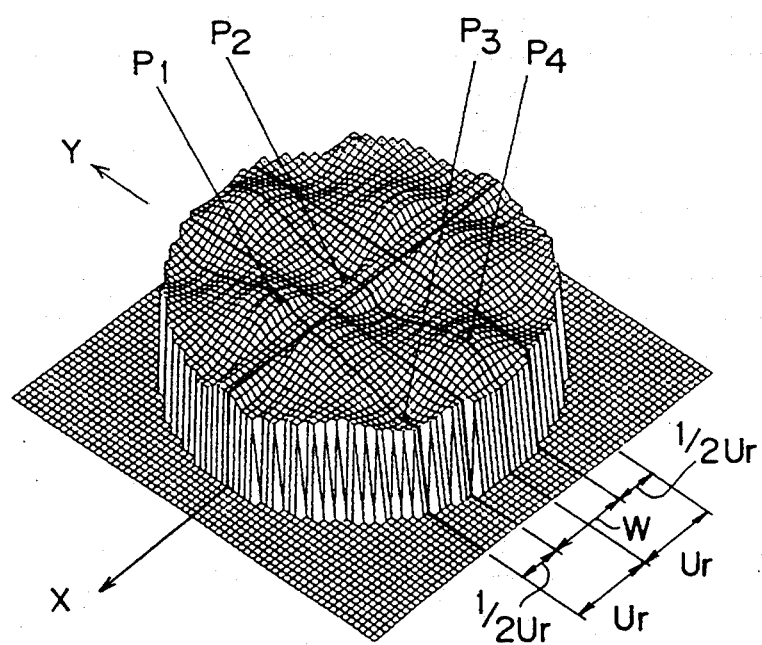
FIG. 7 is a graph showing a mathematically simulated intensity distribution of the light reflected from the disk when there is a pit string formed on the adjacent tracks.

Referring to FIG. 7, the results of a mathematical simulation of the intensity distribution of the light reflected from the optical disk 5 when there are pits only on the adjacent tracks is shown. Comparing portions P1 and P2, the areas corresponding to the phase inversion relationship described above, we can see that the portion P2 is convex relative to the concave shape of the portion P1, and that a similar relationship is observed in portions P3 and P4. This graph shows that there is an actual inversion in the light intensity distribution, and that the mechanism described above is valid. Because there is a quantifiable inversion of values (graphically expressible as sinkages and lands) in the light intensity distribution on the lines X=0 and X=Ur. The ratio between the width of the center photodetective cell RC1 and the laser beam diameter (W/d) affects the crosstalk component. With the above mechanism, however, a large normal crosstalk component will be present in the center photodetective cell RC1, and a large inverse crosstalk component will be present in the two side photodetective cells RC2 and RC3, and the crosstalk cancellation effect of the mechanism is thus enhanced. Furthermore, the crosstalk cancellation effect of the mechanism is still enhanced even when a large inverse crosstalk component is present in the first photodetective cell RC1 and a large normal crosstalk component is present in the two side cells RC2 and RC3. This crosstalk cancellation effect is reduced when both normal and inverse crosstalk components are mixed in all three photodetective cells RC1, RC2, and RC3. This may occur when the dividing lines between the three photodetectors in the three-part photodetection means are set around X=Ur. The ideal position for these dividing lines can be quantified as approximately half of Ur, as will be described later.

Figure 8:
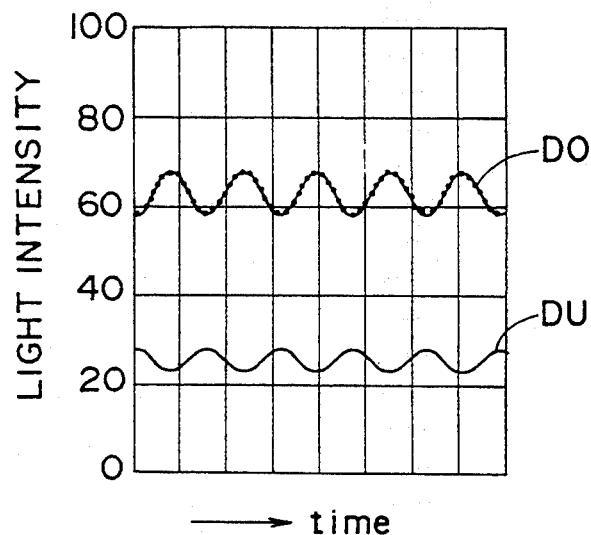
FIG. 8 is a graph showing a time-base phase inversion in the crosstalk component.

Referring to FIG. 8, a time-base phase inversion in the crosstalk component is shown. The line DO shows the time-base phases on the line where X=0, and the line DU on the lines where X=±Ur. Thus, the time-base phase inversion in the crosstalk component is equal to the variation in the total light intensity, corresponding to this light intensity distribution on positions where X=0 and X=±Ur. The crosstalk component can therefore be reduced by adding the signals together, the targeted signal components have the same phase at X=0 and X=Ur and are therefore complementary, but the crosstalk components cancel each other out and crosstalk is therefore reduced. In addition, the effect of this operation can be further enhanced by setting the photodetector dividing lines to obtain the one multiplied signal and the added signals so that the crosstalk component is minimized.

Figure 9A:
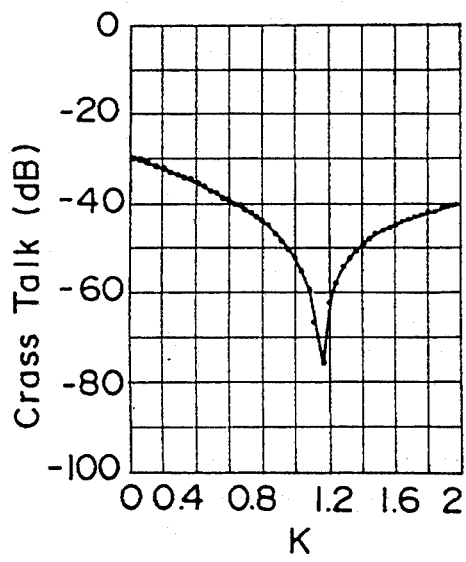
FIGS. 9A and 9B are graphs showing crosstalk values simulated with respect to the constant K and experimented with a predetermined conditions.

Referring to FIG. 9A, crosstalk values simulated with respect to the constant K is shown. The following values were used in the simulation: wavelength of laser beam Lb=780 nm, aperture ratio NA of the condenser lens 4=0.53, track pitch=1.6 μm, and pit pitch is 1.8 μm. The crosstalk is minimized when the constant K=approximately 1.2.

Figure 9B:
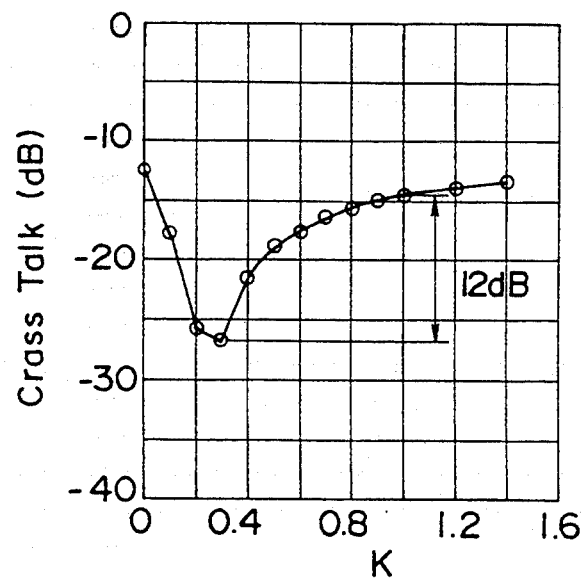

Referring to FIG. 9B, the results of one experiment with an optical disk apparatus according to the present invention are shown. The following values were used in the experiment: wavelength of laser beam Lb=780 nm, aperture ratio NA of the condenser lens 4=0.5, track pitch=0.9 μm, and pit pitch=approximately 1.8 μm. The crosstalk was minimized in this experiment with K=approximately 0.3, reducing the crosstalk by more than 12 dB. It was thus confirmed that the method of the invention is effective in both theory and in practice. The ratio between the width of the center photodetective cell RC1 and the laser beam diameter (W/d) affects the crosstalk component. With the above mechanism, however, when a large normal crosstalk component will be present in the center photodetective cell RC1, and a large inverse crosstalk component will be present in the two side photodetective cells RC2 and RC3, the crosstalk cancellation effect of the mechanism is thus enhanced. Furthermore, the crosstalk cancellation effect of the mechanism is still enhanced even when a large inverse crosstalk component is present in the center photodetective cell RC1, and a large normal crosstalk component is present in the two side photodetective cells RC2 and RC3. This crosstalk cancellation effect is reduced when both normal and inverse crosstalk components are mixed in all three photodetective cells RC1, RC2, and RC3. This may occur when the dividing lines between the three photodetective cells RC1, RC2, and RC3 in the first photodetector 11b are set around X=Ur. The ideal position for these dividing lines can be quantified as approximately half of Ur.

By thus shifting the position of the dividing line used in the three-part photodetection means from the crosstalk phase inversion position, crosstalk can be reduced under a wide range of pit arrangements, track pitches, and other optical conditions. In addition, because the appearance of crosstalk will be different when one of the photodetective cells RC1, RC2, and RC3 is eliminated, a similar effectiveness can be obtained under pit arrangement conditions otherwise resistant to crosstalk reduction.

Figure 10:
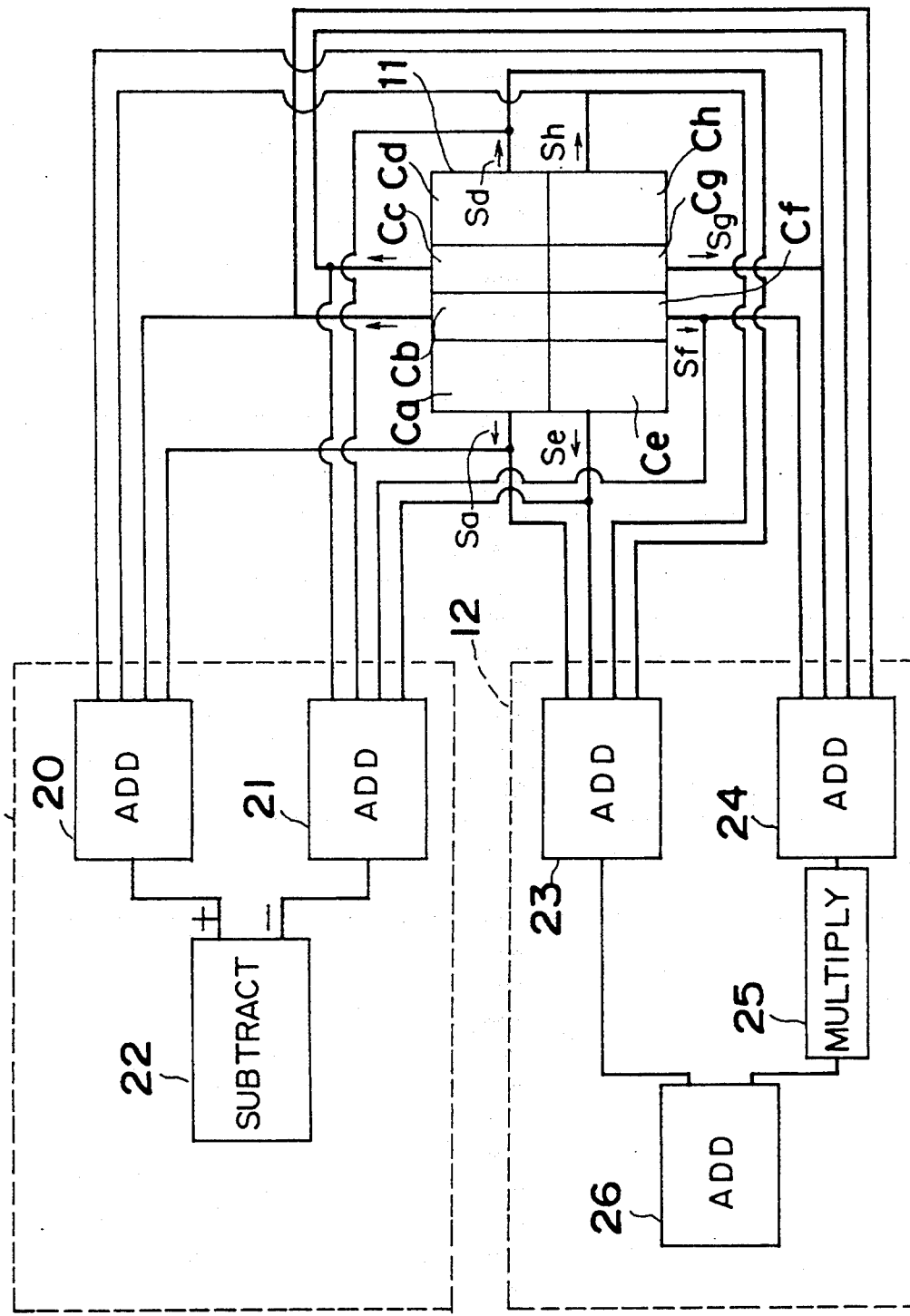
FIG. 10 is a block diagram showing the first photodetector, the focus signal processing unit, and the reproduced signal processing unit of the optical disk apparatus shown in FIG. 1, FIGS. 11 and 12 are block diagrams showing alternations of the optical disk apparatus shown in FIG. 10.

Referring to FIG. 10, the first photodetector 11, the focus signal processing unit 10, and the reproduced signal processing unit 12 according to the first embodiment of the present invention is shown. The first photodetector 11 has a construction combining the example photodetectors 11a and 11b previously described with reference to FIGS. 2 and 3. The first photodetector 11 includes eight rectangular photodetective cells Ca, Cb, Cc, Cd, Ce, Cf, Cg, and Ch, extending in a direction. The photodetective cells Ca, Cb, Cc, and Cd are arranged to close to each other side by side and are aligned to form a first row. The photodetective cells Ce, Cf, Cg, and Ch are also arranged to close to each other side by side and are aligned to form a second row. These two rows are closed to each other side by side so that the first row's cells Ca, Cb, Cc, and Cd oppose to the second row's cells Ce, Cf, Cg, and Ch, respectively, as shown in FIG. 10. These eight photodetective cells Ca, Cb, Cc, Cd, Ce, Cf, Cg, and Ch produce signals Sa, Sb, Sc, Sd, Se, Sf, Sg, and Sh based on the laser beam Lb0 focused thereon.

In thus constructed first photodetector 11, the combinations of photodetective cells Ca and Cb can be used for the photodetective cell C1 of the photodetector 11a which is used for producing a focus signal. Similarly the combination of cells Cc and Cd, Ce and Cf, and Cg and Ch can be used for photodetective cells C2, C3, and C4, respectively. Furthermore, the combinations of photodetective cells Cb, Cc, Cf, and Cg can be used for the center photodetective cell RC1 of the photodetector 11b which is used for producing the reproduced signal S. Similarly, the combination of photodetective cells Ca and Ce can be used for the left side photodetective cell RC2, and, cells Cd and Ch for the right side cell RC3.

The focus signal processing unit 10 includes a first adder 20 having four input ports connected with the cell Ca for receiving the signal Sa, the cell Cb for receiving the signal Sb, the cell Cg for receiving the signal Sg, and the cell Ch for receiving the signal Sh, respectively, and an output port for transmitting an added signal thereof. A second adder 21 having four input ports connected with the cell Cc for receiving the signal Sc, the cell Cd for receiving the signal Sd, the cell Ce for receiving the signal Se, and the cell Cf for receiving the signal Sf, respectively, and an output port for transmitting an added signal thereof. The focus signal processing units 10 further includes a subtracter 22 having a positive input port connected to the output port of the first adder 20 and a negative input port connected to the output port of the second adder 21.

The combinations of photodetective cells Ca and Cb, the cells Cc and Cd, the cells Ce and Cf, and the cells Cg and Ch are equivalent to the photodetective cells C1, C2, C3, and C4 of the photodetector 11a, respectively, as described previously. Therefore, the output signal from the first adder 20 can be expressed as:

$$Sa + Sb + Sg + Sh = (Sa + Sb) + (Sg + Sh) \quad (6)$$
$$= F1 + F4.$$

The output signal from the second adder 21 can be expressed as:

$$Sc + Sd + Se + Sf = (Sc + Sd) + (Se + Sf) \quad (7)$$
$$= F2 + F3.$$

Then, subtraction of the signals by the subtracter 22 can be expressed as:

$$(6) - (7) = Sa + Sb + Sg + Sh - (Sc + Sd + Sa + Sf) \quad (8)$$
$$= F1 + F4 - F2 - F3 = FS.$$

Thus, the focus signal FS is obtained.

The reproduced signal processing unit 12 includes a third adder 23 having four input ports connected with the cell Ca for receiving the signal Sa, the cell Cd for receiving the signal Sd, the cell Ca for receiving the signal Se, and the cell Ch for receiving the signal Sh, respectively, and an output port for transmitting an added signal thereof. A fourth adder 24 having four input ports connected with the cell Cb for receiving the signal Sb, the cell Cc for receiving the signal Sc, the cell Cf for receiving the signal Sf, and the cell Cg for receiving the signal Sg, respectively, and an output port for transmitting an added signal thereof. A multiplier 25 has an input port connected the output port of the fourth adder 24 for receiving the added signal therefrom and an output port for transmitting the received added signal multiplied by a predetermined constant value K. The reproduced signal processing units 12 further includes a fifth adder 26 having two input ports connected to the output ports of the third adder 23 and the fourth adder 24, respectively.

The combinations of photodetective cells Cb, Cc, Cf, and Cg, the cells Ca and Ce, and the cells Cd and Ch are equivalent to the cells RC1, RC2, and RC3, respectively, as described previously. Therefore, the output signal from the third adder 23 can be expressed as:

$$Sa + Se + Sd + Sh = (Sa + Se) + (Sd + Sh) \quad (9)$$
$$= R + L.$$

The output signal from the fourth adder 24 can be expressed as:

$$Sb + Sc + Sf + Sg = (Sb + Sc + Sf + Sg) \quad (10)$$
$$= C.$$

The output signal from the multiplier 25 can be expressed as:

$$(Sb + Sc + Sf + Sg) \times K = K \times C \quad (11).$$

Then, addition of the signals by the fifth adder 25 can be expressed as:

$$(11) + (10) = K \times C + R + L = S \quad (12)$$

Thus, the reproduction signal S is obtained. It is to be noted that the multiplier 25 can be connected with the third adder 23 instead of the fourth adder 24 by selecting any suitable value as the constant K. Then, the same result expressed by the equation (12) can be obtained.

Figure 11:
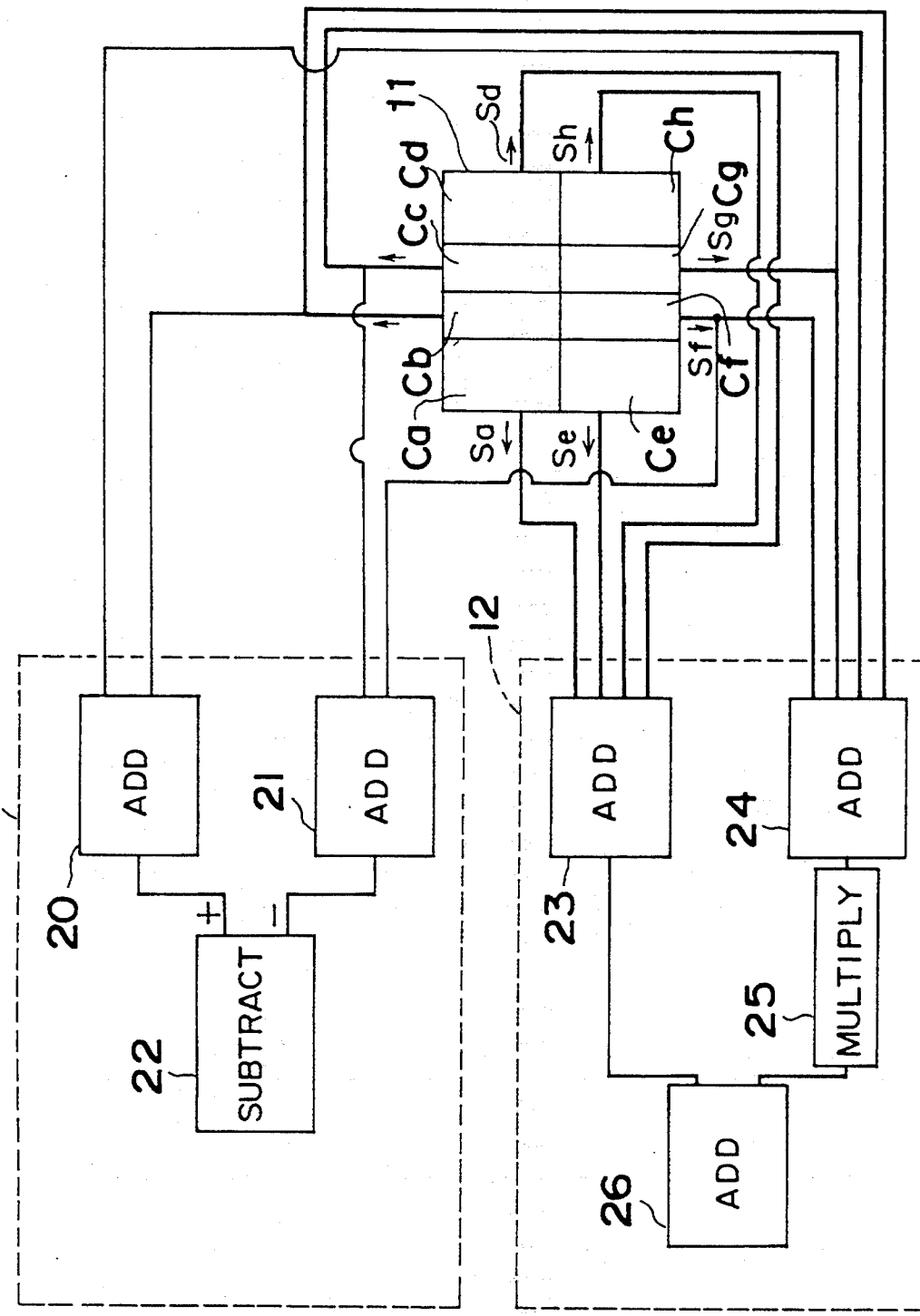

Referring to FIG. 11, an alternation of the first embodiment shown in FIG. 10 is shown. This alternation of the first embodiment has the construction similar to that of the first embodiment of FIG. 10. However, the first adder 20 has only two input ports connected with the cells Cb and Cg, respectively, instead of four input ports (two ports for cells Ca and Ch are deleted from that shown in FIG. 10). The second adder 21 also has only two input ports connected with the cells Cd and Cf, respectively, instead of four input ports (two ports for Cc and Ce are deleted from that shown in FIG. 10). Since the four photodetective cells are enough to detect the focus error, as described in the above, the first adder 20 produces an added signal of Sb and Sg as the added signal of F1 and F4 which can be expressed as:

$$F1+F4=Sb+Sg \quad (6').$$

The second adder 21 produces an added signal of Sc and Sf as the added signal of F2+F3 which can be expressed as:

$$F2+F3=Sc+Sf \quad (7').$$

Then, subtraction of the signals by the subtracter 22 can be expressed as:

$$FS=Sb+Sg-(Sc+Sf) \quad (8').$$

Thus, in this alternation of the first embodiment, since the focus signal FS can be obtained by the photo detective cells Cb, Cc, Cf, and Cg which correspond to the center cell RC1 of the photodetector 11a, it is possible to construct the optical disk apparatus OA1 more simpler compared with the that shown in FIG. 10.

Figure 12:
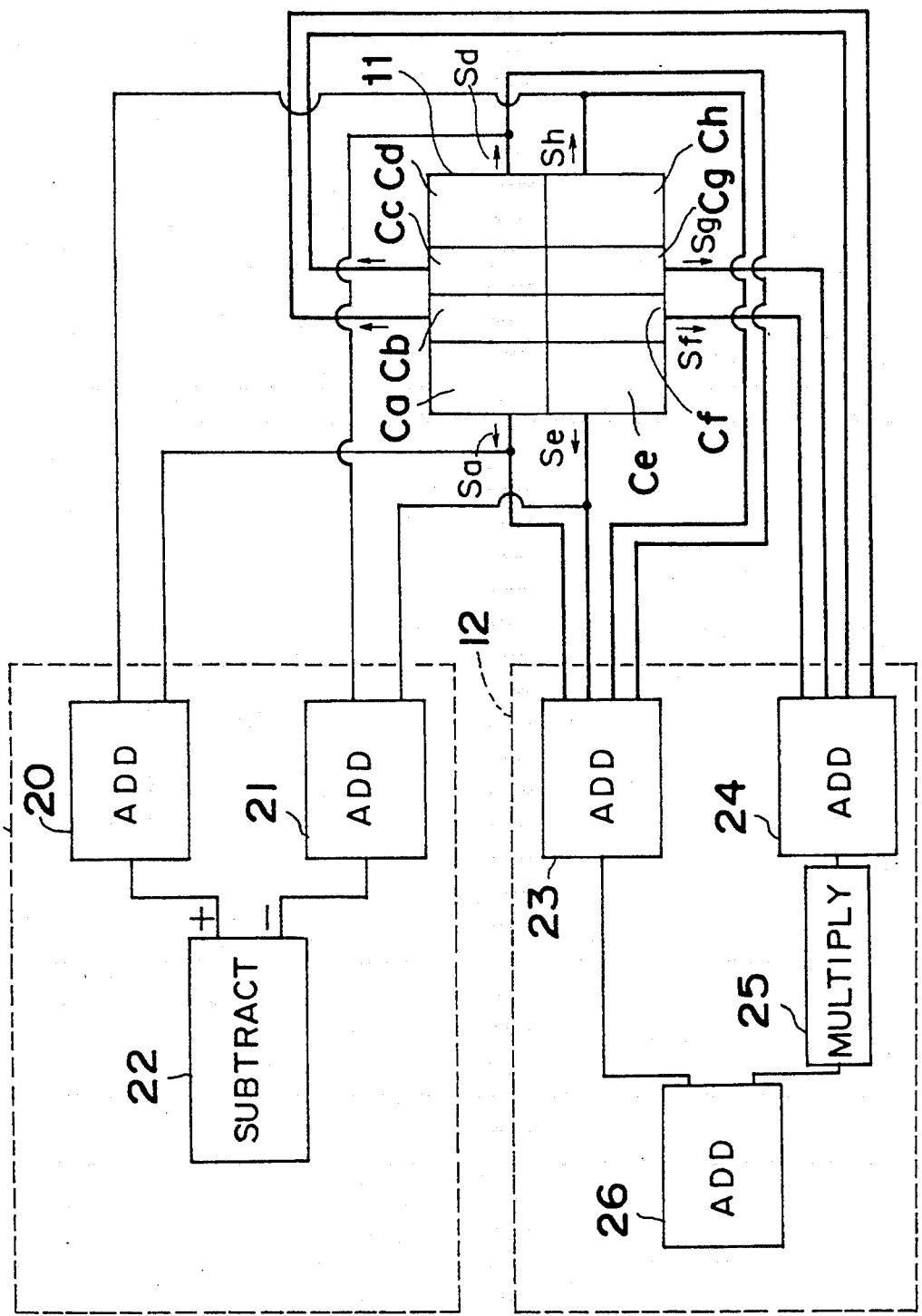

Referring to FIG. 12, another alternation of the first embodiment shown in FIG. 10 is shown. This alternation of the first embodiment has the construction similar to that of the apparatus shown in FIG. 11. However, the first adder 20 has only two input ports connected with the cells Ca and Ch instead of Cb and Cg, respectively. The second adder 21 also has only two input ports connected with the cells Cd and Ce instead of Cc and Cf, respectively. Thus, the first adder 20 produces an added signal of Sa and Sh as the added signal of F1 and F4, which can be expressed as:

$$F1+F4=Sa+Sh \quad (6'').$$

The second adder 21 produces an added signal of Sd and Se as the added signal of F2+F3 which can be expressed as:

$$F2+F3=Sd+Se \quad (7'').$$

Then, subtraction of the signals by the subtracter 22 can be expressed as:

$$FS=Sa+Sh-(Sd+Se) \quad (8'').$$

Thus, in this alternation of the first embodiment, since the focus signal FS can be obtained by the photo detective cells Ca, Cd, Ce, and Ch which correspond to the side cells RC2 and RC3 of the photodetector 11a, it is possible to construct the optical disk apparatus OA1 more simpler compared with the that shown in FIG. 10.

Figure 13:
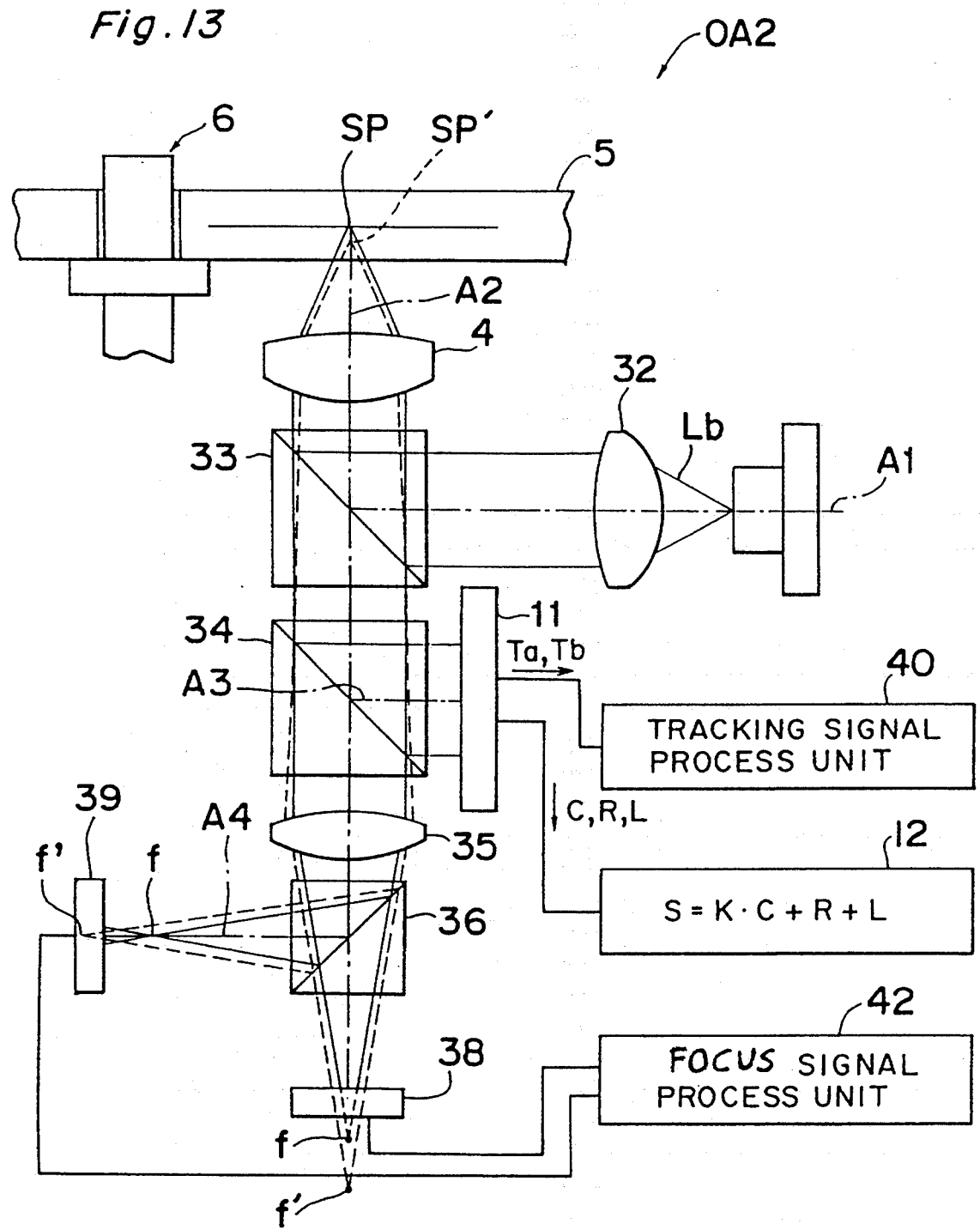
FIG. 13 is a block diagram of an optical disk apparatus according to a second preferred embodiment of the present invention.

Referring to FIG. 13, an optical disk apparatus according to a second embodiment of the present invention is shown. The optical disk apparatus OA2 is used for the tracking error detection by the push-pull method. The optical disk apparatus OA2 has a construction similar to that of the apparatus OA1. The optical disk apparatus OA2 further includes a collimating lens 32 for causing the emitted laser beam Lb to become parallel. A first half mirror 33 is provided on one side of the collimating lens 32 away from the laser source 1 and in the path of the collimated laser beam Lb to reflect a portion of collimated laser beam Lb toward the disk 5 along an optical axis A2, as shown in FIG. 1. A first condenser lens 4 is provided between the first half mirror 33 and the optical disk 5 for converging the reflected laser beam Lb to make spot SP focused on a recording surface R of the optical disk 5.

On the opposite side of the half mirror 33, a second half mirror 34 is provided in the path of the laser beam Lb reflected from the optical disk 5 through the first condenser lens 4 and the first half mirror 33, so that the second half mirror 34 reflects a portion of the reflected laser beam Lb along an optical axis A3 and allows the rest portion of the reflected laser beam Lb therefrom. Thus, the laser beam Lb reflected from the optical disk 5 is divided in two routes along the optical axes A2 and A3, respectively.

Beside the second half mirror 34, the first photodetector 11 is provide with its photodetective surface across the optical axis A3 to receive the divided laser beam Lb to produce electric signals. A tracking signal processing unit 40 and the reproduction signal processing unit 12 are electrically connected with the first photodetector 11. The tracking signal processing unit 40 processes the tracking signals and detects the tracking error by the push-pull method. Since the push-pull method is well known to the personell skilled in the field of optical recording technology, the detailed explanation is omitted for the sake of brevity.

Figure 14:
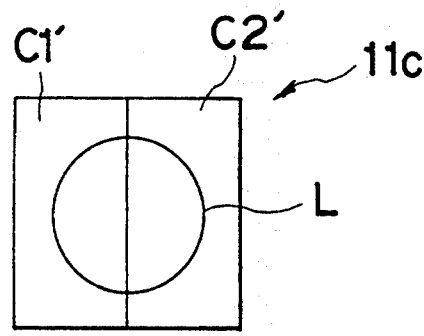
FIG. 14 is a plan view showing an example of photodetector used for tracking error detection by the push-pull method.

Referring to FIG. 14, an example of the first photodetector 11 used for tracking error detection by the push-pull method is shown. The first photodetector 11c has two photodetective cells C1' and C2' arranged close to each other side by side, as shown in FIG. 14. The photodetective cells C1' and C2' produce tracking signals Ta, and Tb based on the portions laser beam Lb focused thereon, respectively. When the laser spot Sp is out of the recording track on the optical disk 5, the light density of laser beam Lb received on the photodetective cells C1' and C2' is uneven with respect to a direction perpendicular to the track direction. Therefore, the tracking signal processing unit 40 can obtains the tracking error signal TS based on the tracking signals Ta and Tb by the push-pull method, as expressed by the following equation, $$TS = Ta - Tb \quad (13)$$

For production of the reproduced signal S, the same patter of the photodetector 11b shown in FIG. 3 is employed. Thus, the first photodetector 11 has a construction combined by these two example photodetectors 37' and 11b, and will be described later with reference to FIG. 16.

Referring back to FIG. 13, on the side of the second half mirror 35 away from the first half mirror 33, a second condenser lens 35 having a focus point f is provided in alignment with the optical axis A2 for converging the laser beam Lb. On the opposite side of the condenser lens 35, a second photodetector 38 is provided with it photodetective surface across the laser beam Lb before the focus point f by a predetermined distance for producing electric signals.

Between the second condenser lens 35 and the second photodetector 38, a third half mirror 36 is further provided in the path of the laser beam Lb to divide the laser beam Lb passed through the second condenser lens 35, so that the third half mirror 36 reflects a portion of the laser beam Lb passed though the second condenser lens 5 along an optical axis A4 and allow the rest portion of the laser beam Lb to pass toward the second photodetector 38. Thus, the laser beam Lb reflected from the optical disk 5 is divided in three routes along the optical axes A2, A3, and A4, respectively.

Beside the third half mirror 36, a third photodetector 39 is provided with its photodetective plane across the optical axis A4 to receive the divided laser beam Lb after the focus point f by the a predetermined distance for producing electric signals based on the received laser beam Lb. A focus signal processing unit 42 is electrically connected with second and third photodetectors 38 and 39 for producing focus error signal FS by the spot size detection method. Since the spot size detection method is well known to the personell skilled in the field of optical recording technology, the further explanation is omitted for the sake of brevity.

In operation, the tracking signal processing unit 40 produces the tracking error signal TS based on the tracking signals produced by the first photodetective by the Push-pull method. The reproduced signal processing unit 12 produces the reproduced signal based on the signals produced by the first photodetector 11 as described in the above. The focus signal processing unit 42 produces the focus error signal FS based on the signal produced by second and third photodetectors 38 and 29 for detection of the focus error by a conventional method.

Figure 15:
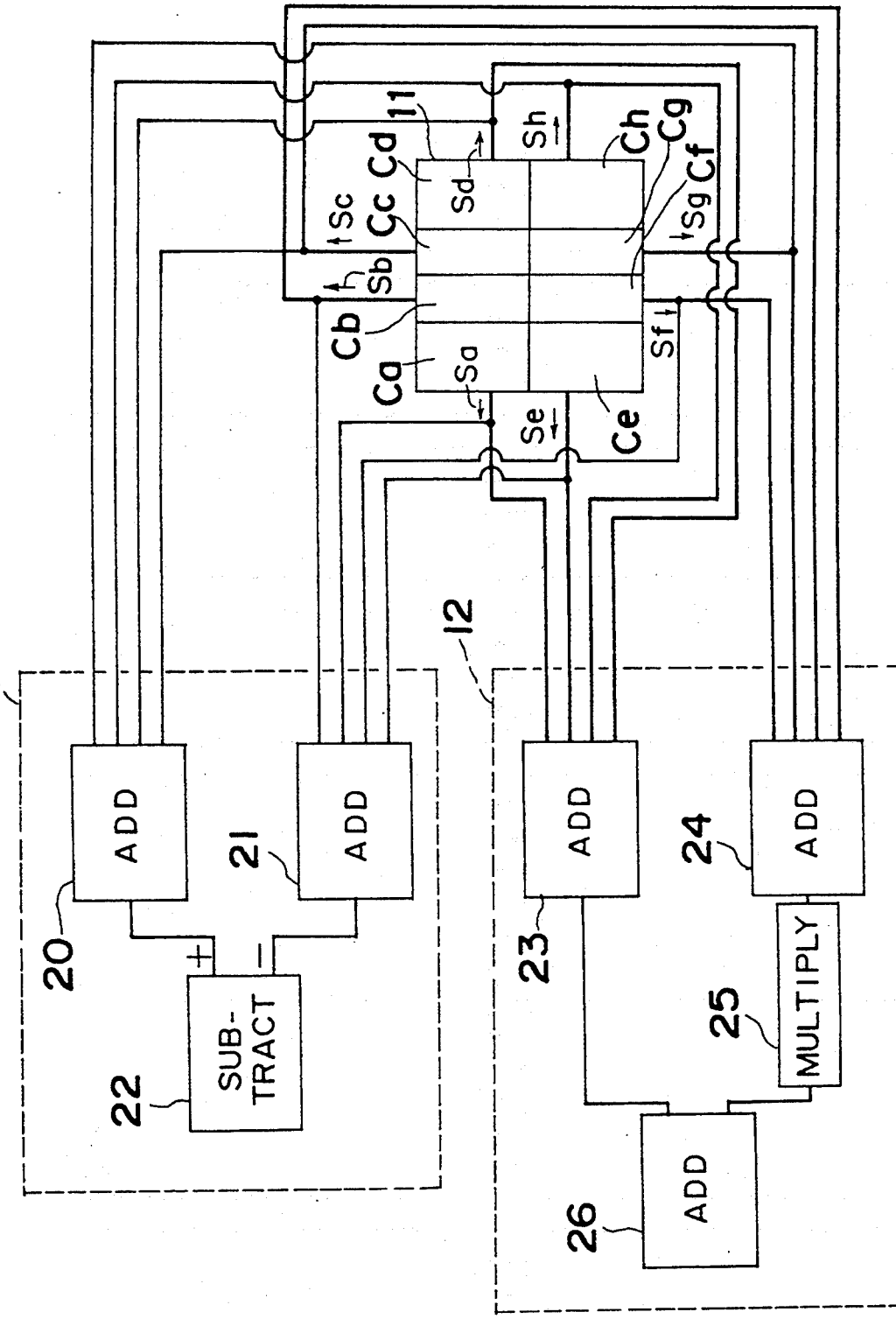
FIG. 15 is a block diagram showing the first photodetector, the tracking signal processing units, and the reproduced signal processing unit of the optical disk apparatus shown in FIG. 13, FIGS. 16 and 17 are block diagrams showing alternations of the optical disk apparatus shown in FIG. 15.

Referring to FIG. 15, the first photodetector 11, the tracking signal processing units 40, and the reproduced signal processing unit 12 according to the second embodiment of the present invention is shown.

The tracking signal processing unit 40 has a construction similar to that of the focus signal processing unit 10 of the first embodiment. However the first adder 20 are connected with the cells Cc, Cd, Cg, and Ch. The second adder 21 are connected with the cells Ca, Cb, Ce, and Cf. Then, the tracking signal processing unit 40 can obtain the tracking signal TS, as expressed by the equation of, $$TS = (Sa + Sb + Se + Sf) - (Sc + Sd + Sg + Sh) \quad (14)$$
$$= Ta - Tb.$$

Figure 16:
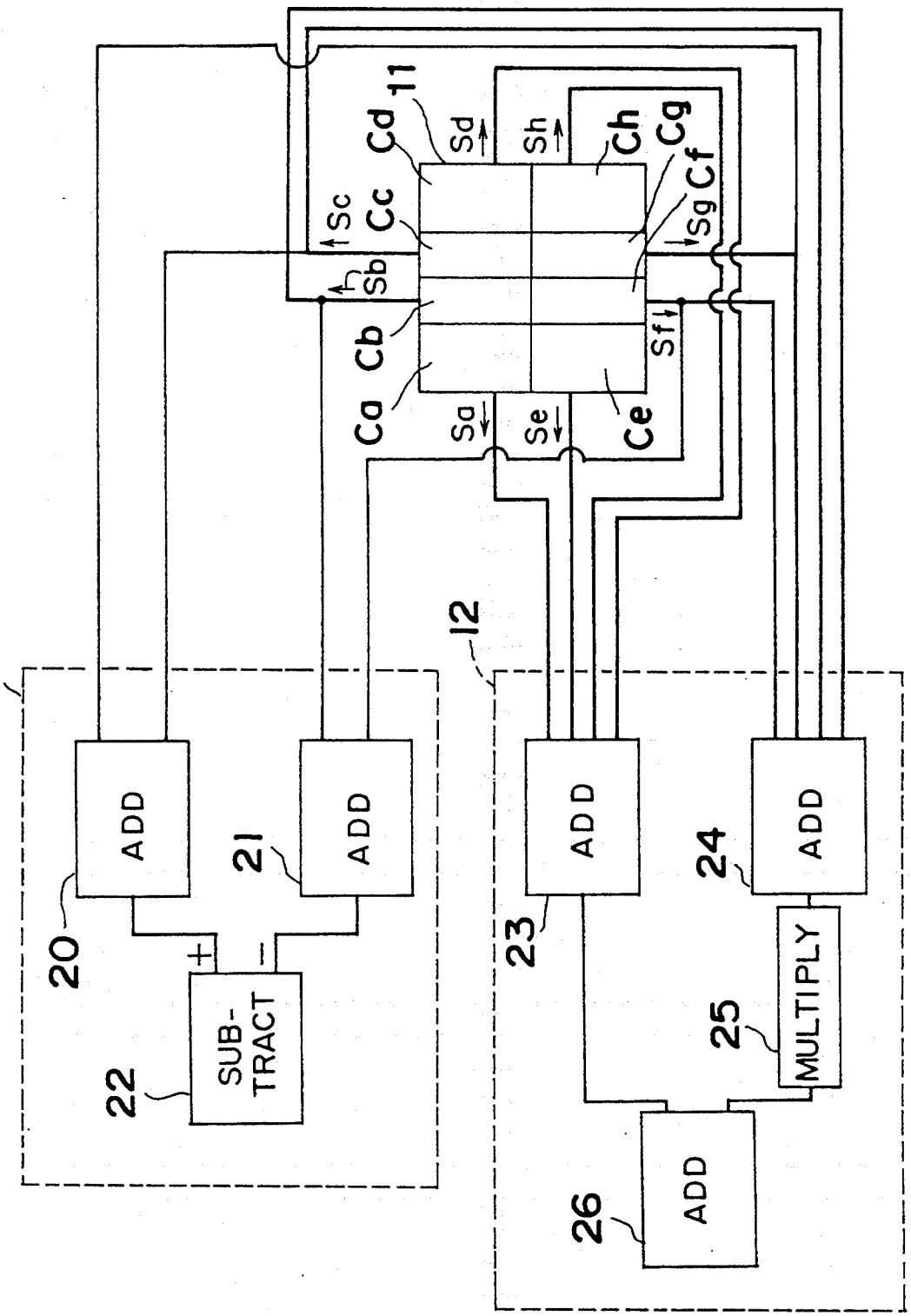

Referring to FIG. 16, an alternation of the second embodiment is shown. This alternation of the second embodiment has the construction similar to that shown in FIG. 15. However, the first adder 20 is connected with only two cells Cc and Cg. The second adder 21 also connected with only two cells Cb and Cf. Then, the tracking signal processing unit 40 can obtain the tracking signal TS, as expressed by the equation of, $$TS = (Sb + Sf) - (Sc + Sg) = Ta - Tb \quad (15).$$

Thus, the tracking error signal TS can be obtained by the photo detective cells Cb, Cc, Cf, and Cg which correspond to the center cell RC1 of the photodetector 11a, resulting in a simpler construction.

Figure 17:
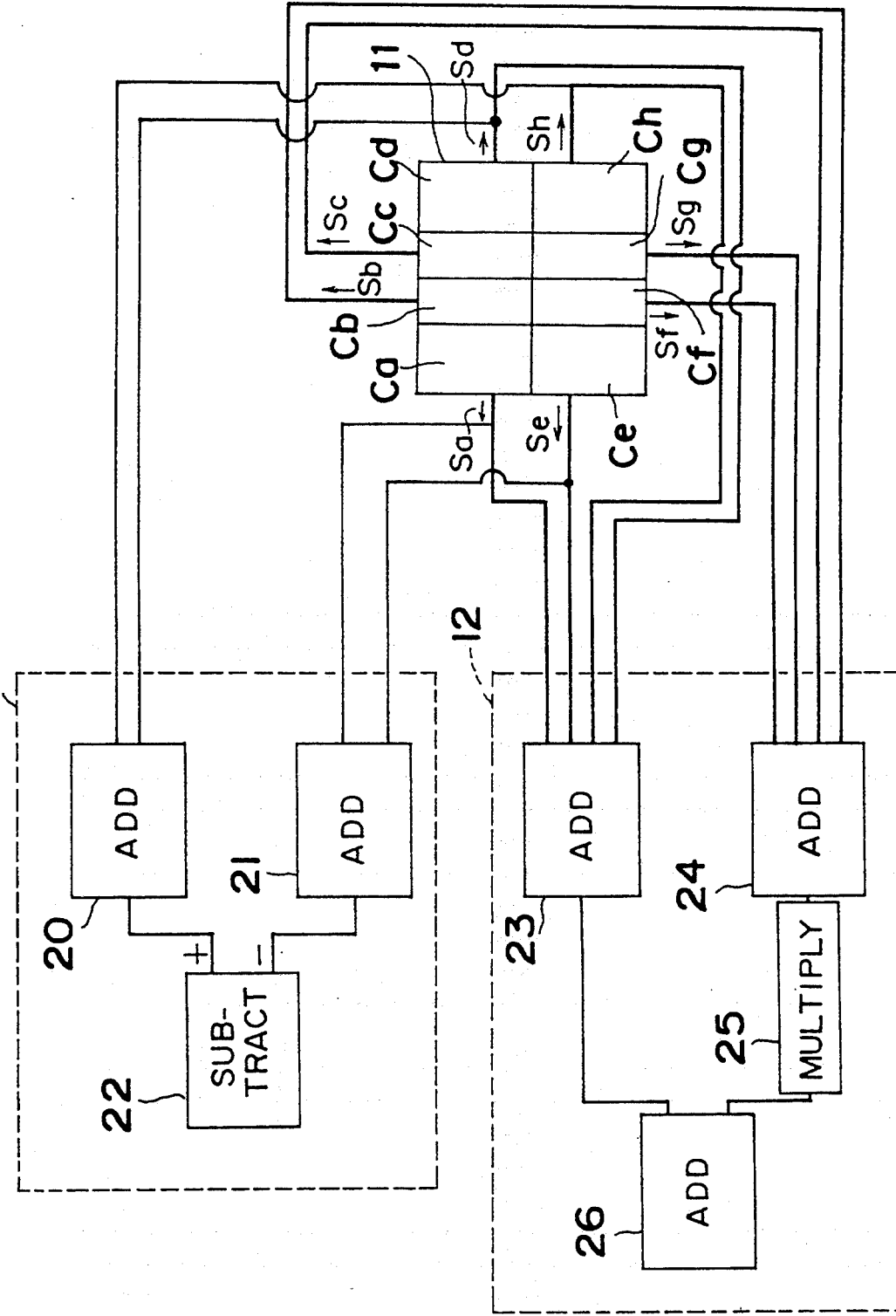

Referring to FIG. 17, another alternation of the second embodiment is shown. In this alternation, the first adder 20 is connected with only two cells Cd and Ch. The second adder 21 also connected with only two cells Ca and Ce. Then, the tracking signal processing unit 40 can obtain the tracking signal TS, as expressed by the equation of, $$TS = (Sa + Se) - (Sd + Sh) = Ta - Tb \qquad (16)$$

Thus, the tracking error signal TS can be obtained by the photo detective cells Ca, Cd, Ce, and Ch which correspond to the side cell RC2 and RC3 of the photodetector 11a, resulting in a simpler construction of the apparatus OA2.

Figure 18:
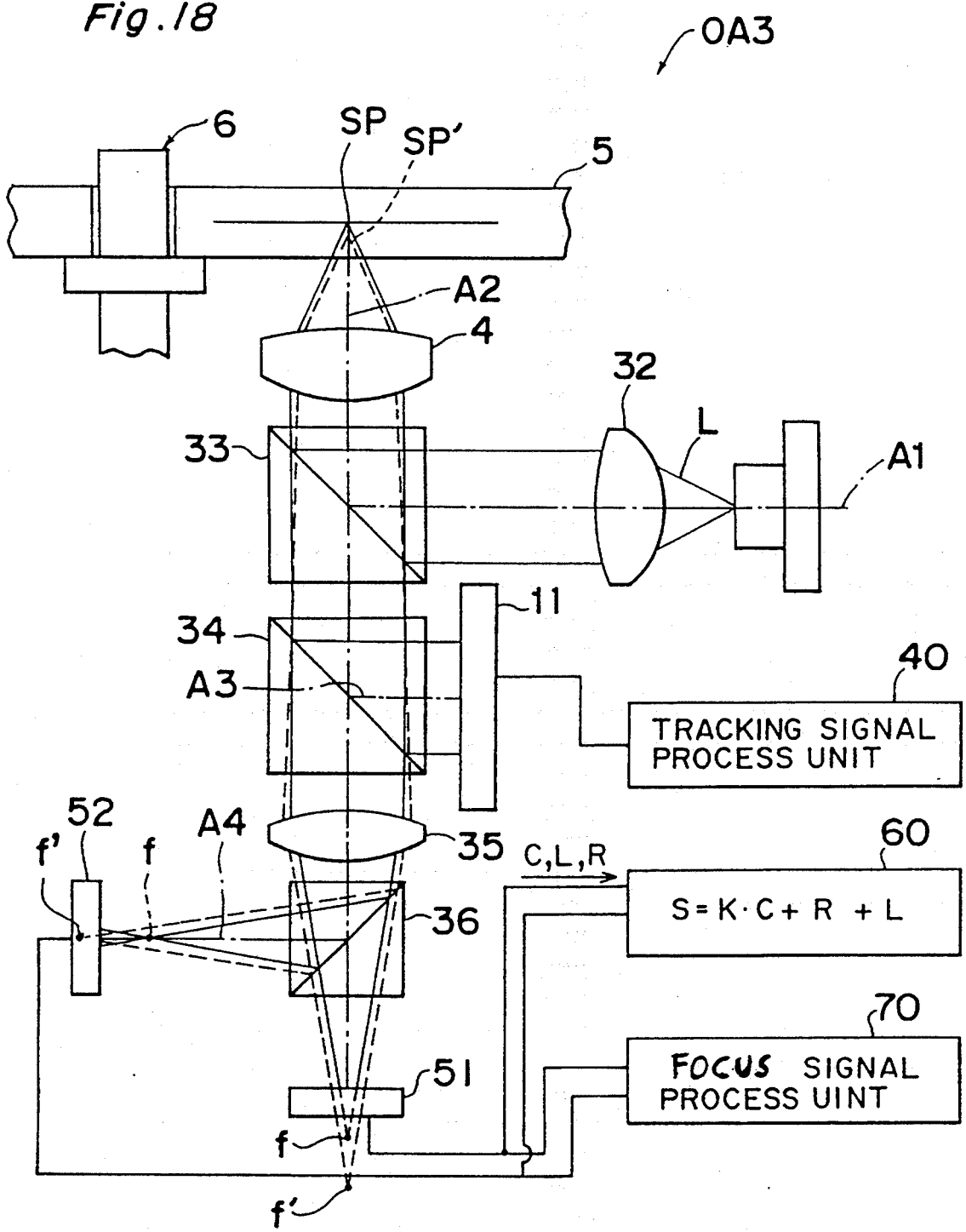
FIG. 18 is a block diagram of an optical disk apparatus according to a third preferred embodiment of the present invention.

Referring to FIG. 18, an optical disk apparatus according to a third embodiment of the present invention is shown. The optical disk apparatus OA3 is used for the focus error detection by the spot size detection method. The optical disk apparatus OA3 has a construction similar to that of the apparatus OA2 of FIG. 13. Second and third photodetectors 38 and 39 of FIG. 13 are replaced by photodetectors 51 and 52. Furthermore, the reproduced signal processing unit 12 and focus signal processing unit 42 are replaced by alternative units 60 and 70, respectively, both of which are connected with the photodetectors 51 and 52.

Figure 19A:
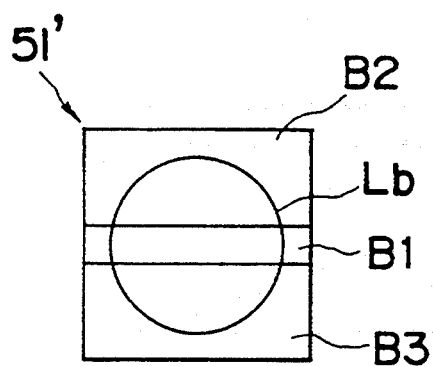
FIGS. 19A and 19B are plan views showing examples of photodetectors used for the spot size detection method.
Figure 19B:
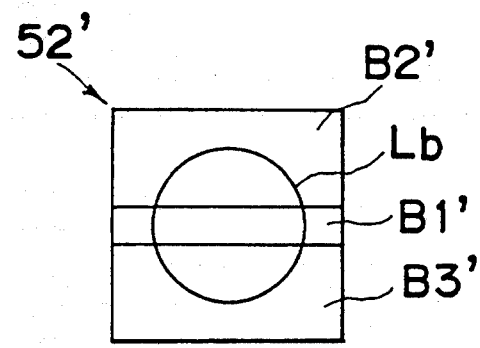

Referring to FIGS. 19A and 19B, examples of second and third photodetectors 51 and 52 used for the spot size detection method are shown. The second photodetector 51' has three rectangular cells B1, B2, and B3, extending parallel to each other. The cells B1 is arranged between the cells B2 and B3 as been sandwitched therebetween side by side. The cells B1, B2, and B3 produce signals SB1, SB2, and SB3 based on the spot of laser beam Lb thereon, respectively. Similarly, the third photodetector 52 has three photodetective cells B1', B2', and B3' for producing signals SB1', SB2', and SB3' respectively.

When the laser spot Sp is out of focus over the optical disk 5, as shown by the dot line (spot Sp') in FIG. 18, the focus point f moves away the present focus point f to the point f' such that the spots on the second photodetector 51 and third photodetector 39 changes accordingly. Therefore, the focus signal processing unit 70 can obtains the focus error signal FS based on the focus signals SB1, SB2, SB3, SB1', SB2', and SB3', as expressed by the following equation, $$FS = SB1' - SB2' - SB3' - SB1 + SB2 + SB3 \qquad (17)$$

Thus, the focus error signal FS can be obtained by using the signals produced by the all cells of second and third photodetectors 51 and 52. However, it is possible to obtain the focus error signal FS by using center cells B1 and B1' only, as expressed by the following equation, $$FS = SB1' - SB1 \qquad (18)$$

The focus error signal FS also can be obtained by using side cells B1, B3, B1', and B3' only, as expressed by the following equation, $$FS = SB1 + SB3 - SB1' - SB2' \qquad (18')$$

Figure 20A:
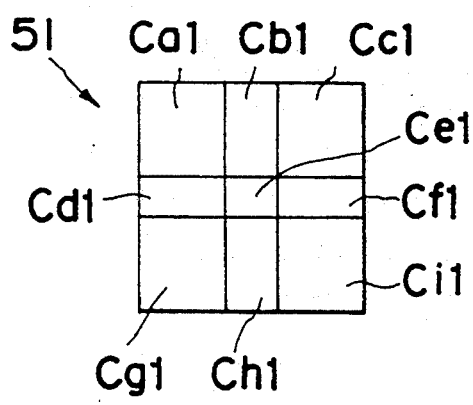
FIGS. 20A and 20B are plan views showing photodetectors used for the information signal reproduction according to the third embodiment.
Figure 20B:
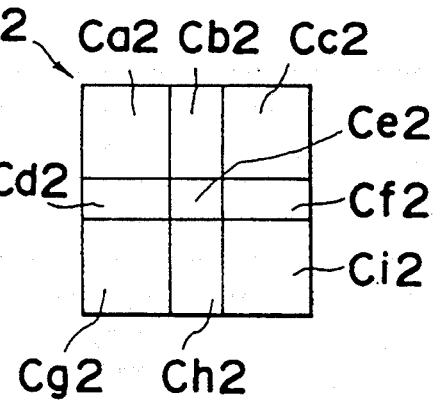

Referring to FIGS. 20A and 20B, second and third photodetectors 51 and 52 used for the information signal reproduction and the focus error detection according to the third embodiment is shown. The second photodetector 51 has a construction combining the example photodetectors 11b and 51' shown in FIGS. 3 and 19A, respectively. The second photodetector 51 includes nine photodetective cells Ca1, Cb1, Cc1, Cd1, Ce1, Cf1, Cg1, Ch1, and Ci1. The photodetective cells Ca1, Cb1, and Cc1 are arranged to close to each other side by side and are aligned to form a first horizontal row. Similarly, the second horizontal row is formed by cells Cd1, Ce1, and Cf1, and the third horizontal row is formed by cells Cg1, Ch1, Ci1. These three rows are arranged close to each other side by side such that the second row is sandwitched by first and third rows, as shown in FIG. 20. When these three rows are assembled, each of three cells Ca1, Cd1, and Cg1, cells Cb1, Ce1, and Ch1, and cells Cc1, Cf1, and Ci1 forms a vertical row, respectively. These photodetective cells Ca1, Cb1, Cc1, Cd1, Ce1, Cf1, Cg1, Ch1, and Ci1 produce signals Sa1, Sb1, Sc1, Sd1, Se1, Sf1, Sg1, Sh1, and Si1, respectively, based on the laser beam Lb spot thereon. Similarly, the third photodetector 51 includes nine photodetective cells Ca2, Cb2, Cc2, Cd2, Ce2, Cf2, Cg2, Ch2, and Ci2 which produce signals Sa2, Sb2, Sc2, Sd2, Se2, Sf2, Sg2, Sh2, and Si2, respectively.

Figure 21:
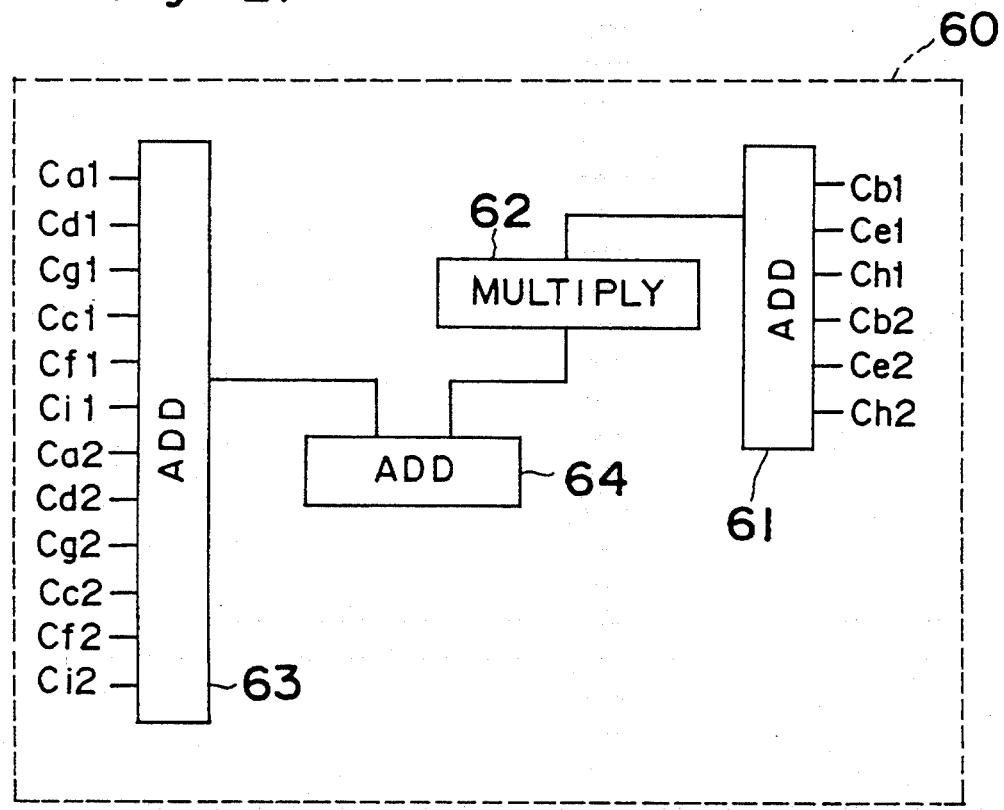
FIG. 21 is a block diagram showing a reproduction signal processing unit shown in FIG. 18.

Referring to FIG. 21, the reproduction signal processing unit 60 is schematically shown. The reproduction signal processing units 60 includes a first adder 61 connected to the cells Cb1, Ce1, Ch1, Cb2, Ce2, and Ch2 for producing a first added signal AS1, which can be expressed as:

$$AS1 = Sb1 + Se1 + Sh1 + Sb2 + Se2 + Sh2 \qquad (19)$$
$$= C.$$

A second adder 63 is connected to the cells Ca1, Cd1, Cg1, Cc1, Cf1, Ci1, Ca2, Cd2, Cg2, Cc2, Cf2, and Ci2, respectively, for producing a second added signal AS2, which can be expressed as:

$$AS2 = Sa1 + Sd1 + Sg1 + Sc1 + Sf1 + Si1 + Sa2 + \qquad (20)$$
$$Sd2 + Sg2 + Sc2 + Sf2 + Si2$$
$$= R + L.$$

A multiplier 62 is provided in connection with the first adder 61 for multiplying the first added signal AS1 by the constant value K. A third adder is provided in connection with the multiplier 62 and the adders 63 for obtaining a third added signal AS3, which can be expressed as:

$$AS3 = AS1 + K \times AS2 \qquad (21)$$
$$= (R + L) + K \times C = S.$$

Thus, the reproduced signal S is obtained.

Figure 22:
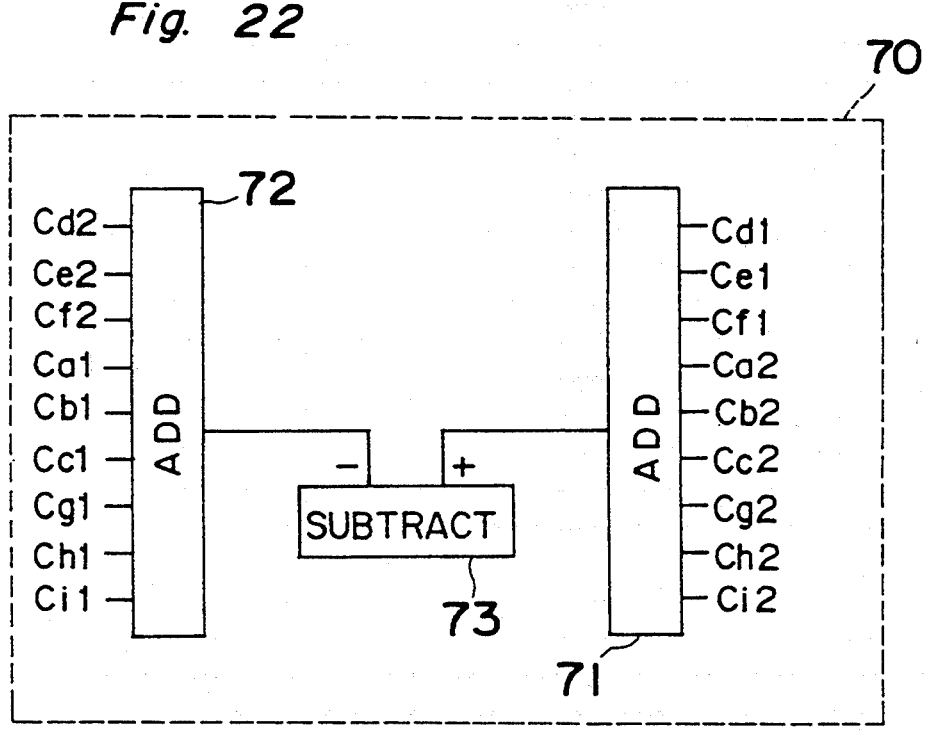
FIG. 22 is a block diagram showing a focus signal processing unit shown in FIG. 18, FIGS. 23 and 24 are block diagrams showing alternations of focus signal processing unit shown in FIG. 22.

Referring to FIG. 22, the focus signal processing unit 70 is schematically shown. The focus signal processing units 60 includes a fourth adder 71 connected to the cells Cd1, Ce1, Cf1, Ca2, Cb2, Cc2, Cg2, Ch2, and Ci2, respectively, for producing a fourth added signal AS4, which can be expressed as:

$$AS4 = Sd1 + Se1 + Sf1 + Sa2 + Sb2 + Sc2 + Sg2 + Sh2 + Si2 \qquad (22)$$

A fifth adder 72 is connected to the cells Cd2, Ce2, Cf2, Ca1, Cb1, Cc1, Cg1, Ch1, and Ci1, respectively, for producing a fifth added signal AS5, which can be expressed as:

$$AS5 = Sd2 + Se2 + Sf2 + Sa1 + Sb1 + Sc1 + Sg1 + Sh1 + Si1 \quad (23).$$

A subtracter 73 is provided in connection with fourth and adders 71 and 72 for producing a subtracted signal SS by subtracting the fifth added signal AS5 from the fourth added signal AS5, expressed as:

$$SS = AS4 - AS5 = FS \quad (24).$$

Thus, the focus error signal FS is obtained.

Figure 23:
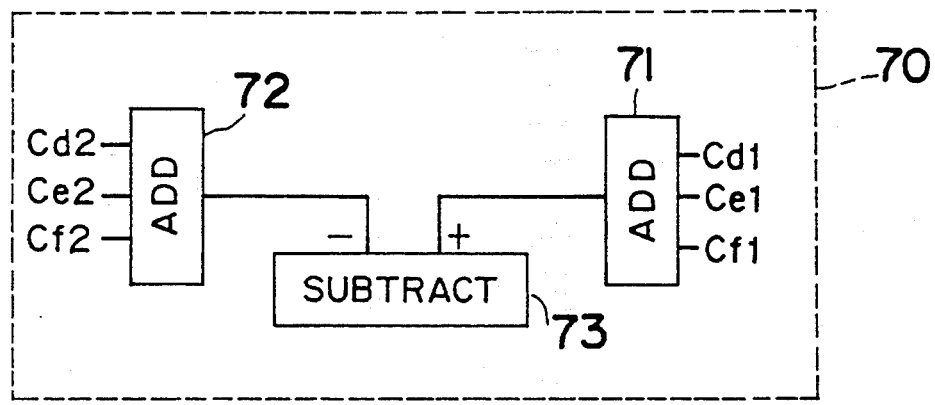

Referring to FIG. 23, an alternation of the focus signal processing unit 70 of FIG. 22 is shown. In this alternative focus signal processing unit 70, the fourth adder 71 is connected to the center cells Cd1, Ce1, and Cf1 for producing the fourth added signal AS4, expressed as:

$$AS4 = Sd1 + Se1 + Sf1 \quad (25).$$

The fifth adder 72 is connected to only the center cells Cd2, Ce2, and Cf2 for producing the fifth added signal AS5, expressed as:

$$AS5 = Sd2 + Se2 + Sf2 \quad (26).$$

The substracter 73 produces the subtracted signal SS by subtracting the fifth added signal AS5 from the fourth added signal AS5, as described above. Thus, the focus error signal FS is obtained by using only the center cells of second and third photodetectors 51 and 52.

Figure 24:
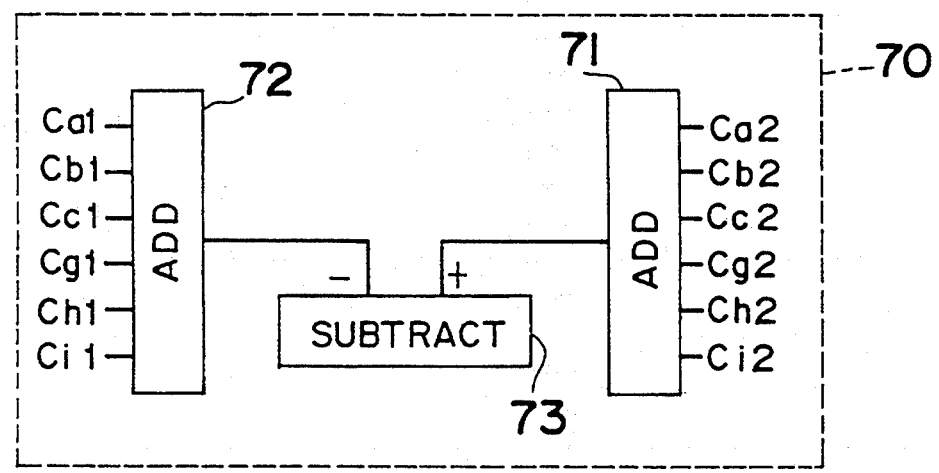
Figure 25:
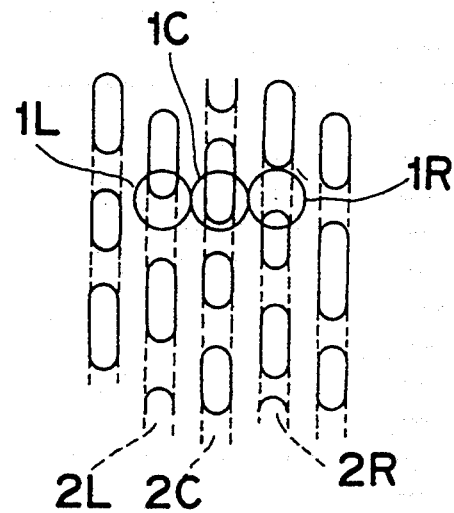
FIG. 25 is an illustration of assistance in explaining the crosstalk reducing method of the prior art.

Referring to FIG. 24, another alternation of the focus signal processing unit 70 is shown. In this alternative focus signal processing unit 70, the fourth adder 71 is connected to only the side cells Ca2, Cb2, Cc2, Cg2, Ch2, and Ci2 for producing the fourth added signal AS4, expressed as:

$$AS4 = Sa2 + Sc2 + Sc2 + Sg2 + Sh2 + Si2 \quad (27).$$

The fifth adder 72 is connected to only the center cells Ca1, Cb1, Cc1, Cg1, Ch1, and Ci1 for producing the fifth added signal AS5, which can be expressed as:

$$AS5 = Sa1 + Sb1 + Sc1 + Sg1 + Sh1 + Si1 \quad (28).$$

The subtracter 73 produces the subtracted signal SS as described above. Then, the focus error signal FS is obtained by using only the side cells of second and third photodetectors 51 and 52.

As a result, an optical disk apparatus according to the present invention can reduce crosstalk in a playback signal using a single optical beam, and it is therefore no longer necessary to increase the number of semiconductor lasers to improve playback performance. Furthermore, the optical disk apparatus according to the present invention, it is also possible to detect tracking error and focus error at the same time of playing back the information recorded on the optical disk without any apparatus for detection of tracking error and focus error separately.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disk apparatus for reproducing an information recorded on a recording track of an optical recording medium comprising:

a light source means for emitting a laser beam having a first path in a first direction;

a beam collimation means located in said first path for collimating said emitted laser beam;

a first converging means located in said first path between said optical recording medium and said beam collimation means for converging said collimated emitted laser beam on said recording track;

a first beam guide means located between said beam collimation means and said first converging means for guiding a portion of reflected laser beams from said optical recording medium through said first converging means in a second direction to produce a first guided laser beam having a second path;

a second converging means having a focal point located in said second path for converging said first guided laser beam on said focal point;

a second beam guide means located in said second path between said first guide means and said second converging means for guiding a portion of said first guided laser beams in a third direction to produce a second guided laser beam having a third path;

a first photodetection means located in said third path for receiving said second guided laser beam to produce tracking signals and information signals based on said second guided laser beam received thereon, said first photodetection means formed by dividing a photoelectric element into four portions vertically and into two portions horizontally such that eight segments of said divided photoelectric element are arranged in a matrix, said matrix formed in a rectangular shape, each of said eight segments producing an electric signal based on said second guided laser beam received thereon;

a second photodetection means located in said second path between said second converging means and said focal point, said second photodetection means receiving said first guide laser beam to produce a first focus signal;

a beam dividing means located in said second path between said second converging means and said second photodetection means for guiding a portion of said first guided laser beam in a fourth direction to produce a third guided laser beam having a fourth path;

a third photodetection means located in said fourth path far away from said focal point, said third photodetection means receiving said third guided laser beam to produce a second focus signal; and a signal reproduction means connected with said first photodetection means for reproducing said record signal, said signal reproduction means comprising:

(a) a first addition means for adding signals produced by four of said eight segments arranged in opposite vertical side end portions of said matrix to produce a first added signal;

(b) a second addition means for adding signals produced by four of said eight segments arranged in center portions of said matrix to produce a second added signal;

(c) a multiplier means for multiplying said second added signal by a predetermined value to produce a first multiplied signal; and (d) a third addition means for adding said first added signal and said first multiplied signal to produce said record signal.

2. An optical disk apparatus as claimed in claim 1 further comprising a tracking signal processing means connected with said first photodetection means for producing said tracking error signal, said tracking signal processing means comprising:

a fourth addition means for adding signals produced by four of said segments arranged on a left half portion of said matrix to produce a first tracking signal;

a fifth addition means for adding signals produced by four of said segments arranged on a right half portion of said matrix to produce a second tracking signal; and a subtraction means for obtaining a difference between said first and second tracking signals to produce said tracking error signal.

3. An optical disk apparatus as claimed in claim 2, wherein said fourth addition means adds signals produced by two of said segments vertically aligned on one side thereof opposite to said right half portion to produce said first tracking signal, wherein said fifth addition means adds signals produced by two of said segments vertically aligned on one side thereof opposite to said left half portion to produce said second tracking signal.

4. An optical disk apparatus as claimed in claim 2, wherein said fourth addition means adds signals produced by two segments vertically aligned on one side thereof away from said right half portion to produce said first tracking signal, wherein said fifth addition means adds signals produced by two of segments vertically aligned on one side thereof away from said left half portion to produce said second tracking signal.

5. An optical disk apparatus for reproducing an information recorded on a recording track of an optical recording medium comprising:

a light source means for emitting a laser beam having a first path in a first direction;

a beam collimation means located in said first path for collimating said emitted laser beam;

a first converging means located in said first path between said optical recording medium and said beam collimation means for converging said collimated emitted laser beam on said recording track;

a first beam guide means located between said beam collimation means and said first converging means for guiding a portion of reflected laser beams from said optical recording medium through said first converging means in a second direction to produce a first guided laser beam having a second path;

a second converging means having a focal point located in said second path for converging said first guided laser beam on said focal point;

a second beam guide means located in said second path between said first guide means and said second converging means for guiding a portion of said first guided laser beams in a third direction to produce a second guided laser beam having a third path;

a first photodetection means located in said third path for receiving said second guided laser beam to produce tracking signals and information signals based on said second guided laser beam received thereon, said first photodetection means formed by dividing a photoelectric element into four portions vertically and into two portions horizontally such that eight segments of said divided photoelectric element are arranged in a matrix, said matrix formed in a rectangular shape, each of said eight segments producing an electric signal based on said second guided laser beam received thereon;

a second photodetection means located in said second path between said second converging means and said focal point, said second photodetection means receiving said first guide laser beam to produce a first focus signal;

a beam dividing means located in said second path between said second converging means and said second photodetection means for guiding a portion of said first guided laser beam in a fourth direction to produce a third guided laser beam having a fourth path;

a third photodetection means located in said fourth path far away from said focal point, said third photodetection means receiving said third guided laser beam to produce a second focus signal; and a signal reproduction means connected with said first photodetection means for reproducing said record signal, said signal reproduction means comprising:

(a) a first addition means for adding signals produced by four of said eight segments arranged in opposite vertical side end portions of said matrix to produce a first added signal;

(b) a second addition means for adding signals produced by four of said eight segments arranged in center portions of said matrix to produce a second added signal;

(c) a multiplier means for multiplying said first added signal by a predetermined value to produce a second multiplied signal; and (d) a third addition means for adding said second added signal and said second multiplied signal to produce said record signal.

* * * * *